(12) United States Patent
Parkinson (10) Patent No.: US 8,274,682 B2
(45) Date of Patent: *Sep. 25, 2012

(54) COMBINING UNIX COMMANDS WITH EXTENSIBLE MARKUP LANGUAGE ("XML")

(75) Inventor: Steven W Parkinson, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 952 days.

This patent is subject to a terminal disclaimer.

(21) Appl. No.: 12/251,687

(22) Filed: Oct. 15, 2008

(65) Prior Publication Data

US 2009/0144286 A1   Jun. 4, 2009

Related U.S. Application Data

(62) Division of application No. 11/948,400, filed on Nov. 30, 2007, now Pat. No. 7,453,593.

(51) Int. Cl.
*G06F 3/12* (2006.01)
*G06K 15/00* (2006.01)

(52) U.S. Cl. ..................................... 358/1.15; 358/1.13

(58) Field of Classification Search ............... 358/1.1, 358/1.9, 1.13, 1.15, 402; 382/276, 302; 700/219; 704/8, 9; 707/100, 101, 103 R; 709/219; 715/236, 237, 276, 239, 760; 717/112, 143, 717/144
See application file for complete search history.

(56) References Cited

U.S. PATENT DOCUMENTS

| | | | |
|---|---|---|---|
| 6,996,769 B1 | 2/2006 | Peikes et al. | |
| 7,134,075 B2 * | 11/2006 | Hind et al. | 715/239 |
| 7,167,874 B2 * | 1/2007 | Shalabi et al. | 1/1 |
| 7,453,593 B1 | 11/2008 | Parkinson | |
| 7,500,201 B2 * | 3/2009 | Treibach-Heck et al. | 715/780 |
| 2003/0037069 A1 | 2/2003 | Davison | |
| 2003/0172127 A1 | 9/2003 | Northrup et al. | |
| 2004/0060006 A1 * | 3/2004 | Lindblad et al. | 715/513 |
| 2004/0205591 A1 | 10/2004 | Nagao | |
| 2005/0198060 A1 * | 9/2005 | Imaki et al. | 707/102 |
| 2005/0262476 A1 | 11/2005 | Felts | |
| 2006/0117307 A1 * | 6/2006 | Averbuch et al. | 717/143 |
| 2006/0190575 A1 | 8/2006 | Harvey et al. | |

* cited by examiner

*Primary Examiner* — Gabriel Garcia
(74) *Attorney, Agent, or Firm* — Lowenstein Sandler PC (57) ABSTRACT

A method and system for using Unix commands with web services are described. The method includes reading at least one delimiter-separated string on a standard input, and preparing a request to a web service from the at least one delimiter-separated string, where the web service is specified by a command-line argument. The method further includes transmitting the request to the web service, and providing, to a standard output, a response of the web service to the request.

19 Claims, 8 Drawing Sheets

Fig. 8

COMBINING UNIX COMMANDS WITH EXTENSIBLE MARKUP LANGUAGE ("XML")

REFERENCE TO RELATED APPLICATION

This application is a divisional of U.S. application Ser. No. 11/948,400 filed Nov. 30, 2007, now U.S. Pat. No. 7,453,593, which is hereby incorporated by reference.

FIELD

The invention relates to modular data processing techniques. More specifically, the invention relates to techniques for incorporating processing functions with complex input and/or output structures into a processing pipeline.

BACKGROUND

UNIX® is a registered trademark referring to a computer operating system ("OS") developed at Bell Labs in about 1969, but the term has become associated with a number of operating systems that merely share some characteristics with the original OS. In the present disclosure, the word Unix will be used to denote UNIX® and UNIX-like operating systems, including BSD (a variant of UNIX), LINUX® (an independently-developed OS with many points of similarity), Mac OS® X (an operating system derived from BSD that is commonly used on Macintosh® computers from Apple Computer Corporation of Cupertino, Calif.), and other systems that encourage or support the pipelined data processing techniques described below.

In a Unix system, a variety of small, single-purpose (or limited-purpose) applications is usually provided, and sophisticated data manipulations can be accomplished by setting up a "pipeline" of these small applications, each application to perform a stage or step of the complete manipulation. Such a pipeline may be defined or expressed as a textual command:

data-generator|step-1|step-2| . . . |data-consumer
Listing 1

The vertical bars ("|") in Listing 1 are pronounced "pipe" when the command is read aloud. The command above expresses a data processing pipeline in which a program named data-generator produces some sort of information, which is passed (as if through a pipe) to a second program, step-1, that performs a first manipulation. The manipulated data from step-1 is in turn passed to step-2 for further manipulation, and so on, until the processed data finally makes it to data-consumer for disposition. For example, data-consumer may store the processed data in a file, print it, operate a machine according to the processed data, etc. Information flowing through a pipeline is commonly (though not necessarily) represented as printable text characters and separated into larger groups or units by delimiters such as newline characters.

Applications or "utilities" that can be used in a data processing pipeline operate to receive data from a predetermined source known as the "standard input," and send their results to a predetermined destination known as the "standard output." Informational and error messages may be emitted on a "standard error," and systems often arrange for these messages to be displayed to the user. A pipeline is constructed by connecting the standard output of one program to the standard input of the next program using an interprocess communication facility. (Setting up a pipeline may be referred to as "plumbing" the data connections.) Most pipeline-compatible applications operate on unstructured data (e.g., a stream of bytes), singular data objects (e.g., a graphical image or a sound clip), or a plurality of delimiter-separated units of text such as words or lines.

Data pipelines provide an easy way to express a complicated sequence of manipulations from a command-line user interface ("UI"), where a computer user types commands to be executed, on a keyboard. Such command-line interfaces ("CLI") were in widespread use for many years, and have survived for certain applications despite the current popularity of graphical user interfaces ("GUIs"). CLIs are often easier to use in setting up Unix-style data processing pipelines, while GUIs provide a more intuitive paradigm for controlling large, monolithic applications with many built-in features and options.

Novel extensions to the traditional CLI pipeline can permit structured data streams to feed or be used within a pipeline.

BRIEF DESCRIPTION OF THE DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

DETAILED DESCRIPTION

Embodiments of the invention permit distributed data processing services (commonly called web services) to be used from a command-line interface ("CLI") in a data processing pipeline. Syntax and functionality are provided so that a CLI user can feed data from a file or prior processing step to a web service, and can extract information of interest from a structured document returned by the web service. The functions can be used independently: a pipeline may simply submit one or more requests to a data processing service based on data presented to a standard input; or a particular section of one or more previously-obtained structured documents such as Extensible Markup Language ("XML") documents can be sent to a standard output for further processing in a pipeline. One embodiment of the invention produces valid structured documents based on unstructured input.

Figure 1:
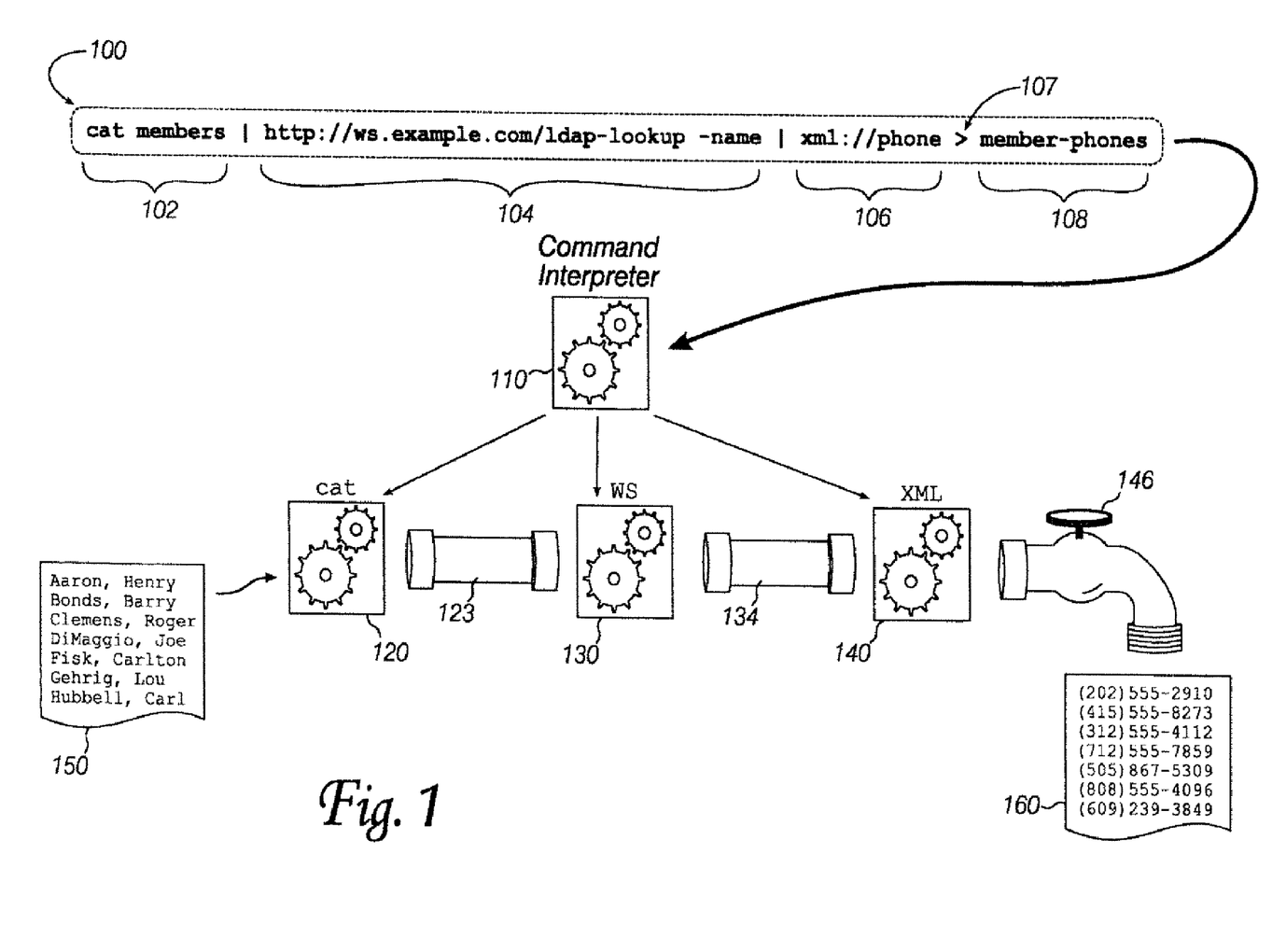
FIG. 1 is a schematic representation of interactions between several embodiments of the invention.

FIG. 1 shows a command line 100 that expresses a data processing pipeline incorporating several novel features. The overall function of the pipeline is to obtain phone numbers for people whose names are listed in a file called "members". Command line 100 consists of several individual commands 102, 104 and 106, separated by vertical bar ('|' or "pipe") characters. A command interpreter 110 receives command line 100 and parses it into its constituent portions, then sets up several child processes to perform each individual processing step. For example, "cat members" command 102 gives rise to cat process 120. Similarly, the portion of command line 100 indicated at 104 produces process 130, and portion 106 produces process 140. Command interpreter 110 also arranges interprocess communication facilities ("pipes") 123 and 134, so that the output of process 120 feeds process 130, and the output of process 130 feeds process 140. The "greater-than" symbol ('>') 107 causes command interpreter 110 to direct the output of process 140 into a file 160 named "memberphones". (This redirection is represented in FIG. 1 as faucet 146.) Cat process 120 obtains the name of input file 150 from its arguments and reads the file, sending this data through pipe 123 to process 130.

Figure 2:
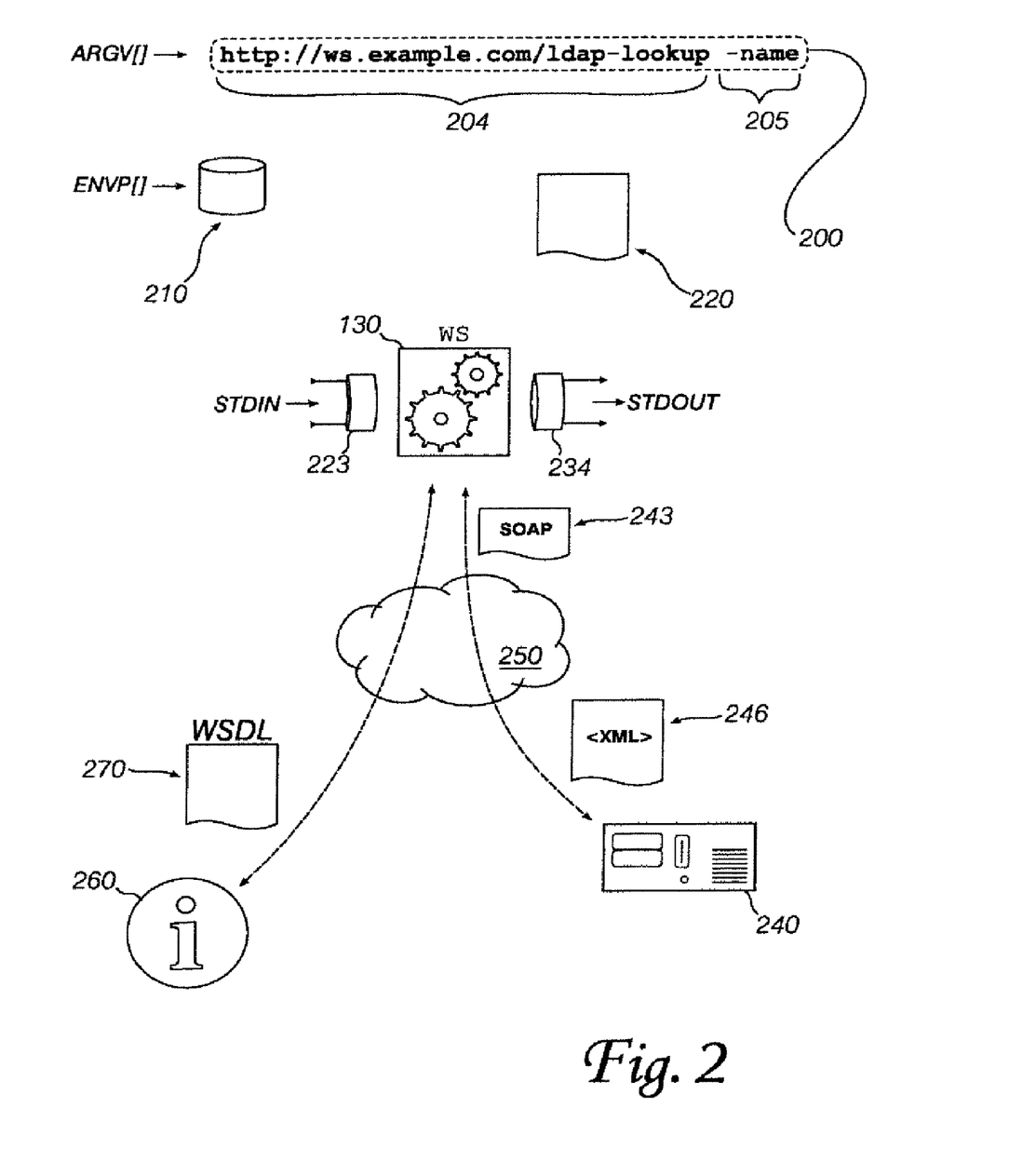
FIG. 2 is a detailed view of an embodiment that issues requests to a remote data processing service.

FIG. 2 shows details of process 130 from FIG. 1. When started, process 130 has access to its command line 200, which is a portion 104 of command line 100. Process 130 can obtain other information to adjust its operations from a set of strings known as an "environment," shown here as a database 210. Process 130 may also read configuration or control information from a file 220. These information sources allow process 130 to determine what actions are desired of it.

Process 130 is launched with a standard input 223 and a standard output 234. Data to be processed can be read from standard input 223, and processed data will be written to standard output 234. Process 130 is to issue one or more requests to a remote processing service at system 240, the requests to be sent over a distributed data communication network 250 such as the Internet. Requests may be formatted according to a Simple Object Access Protocol ("SOAP") 243, and responses may be returned as structured documents in, for example, the Extensible Markup Language ("XML") 246.

In some embodiments, process 130 may refer to an information broker 260 to obtain information about the request format accepted by the remote processing service at system 240. For example, process 130 may contact a Universal Description, Discovery and Integration ("UDDI") service 260, and obtain a Web Services Description Language ("WSDL") document describing valid requests. Another information broker that may be suitable for use with an embodiment of the invention is the Common Object Request Broker Architecture ("CORBA").

In FIGS. 1 and 2, the portions of the command lines corresponding to the remote service are formatted as Uniform Resource Locators ("URLs"). This formatting is familiar to those of skill in the art, expressive of the information necessary to identify and access web services, and convenient to use from a text-based command line. Although an embodiment may use a different mechanism to cause a command interpreter to launch a process to interact with a remote service provider, the URLs shown here are preferred.

Figure 3:
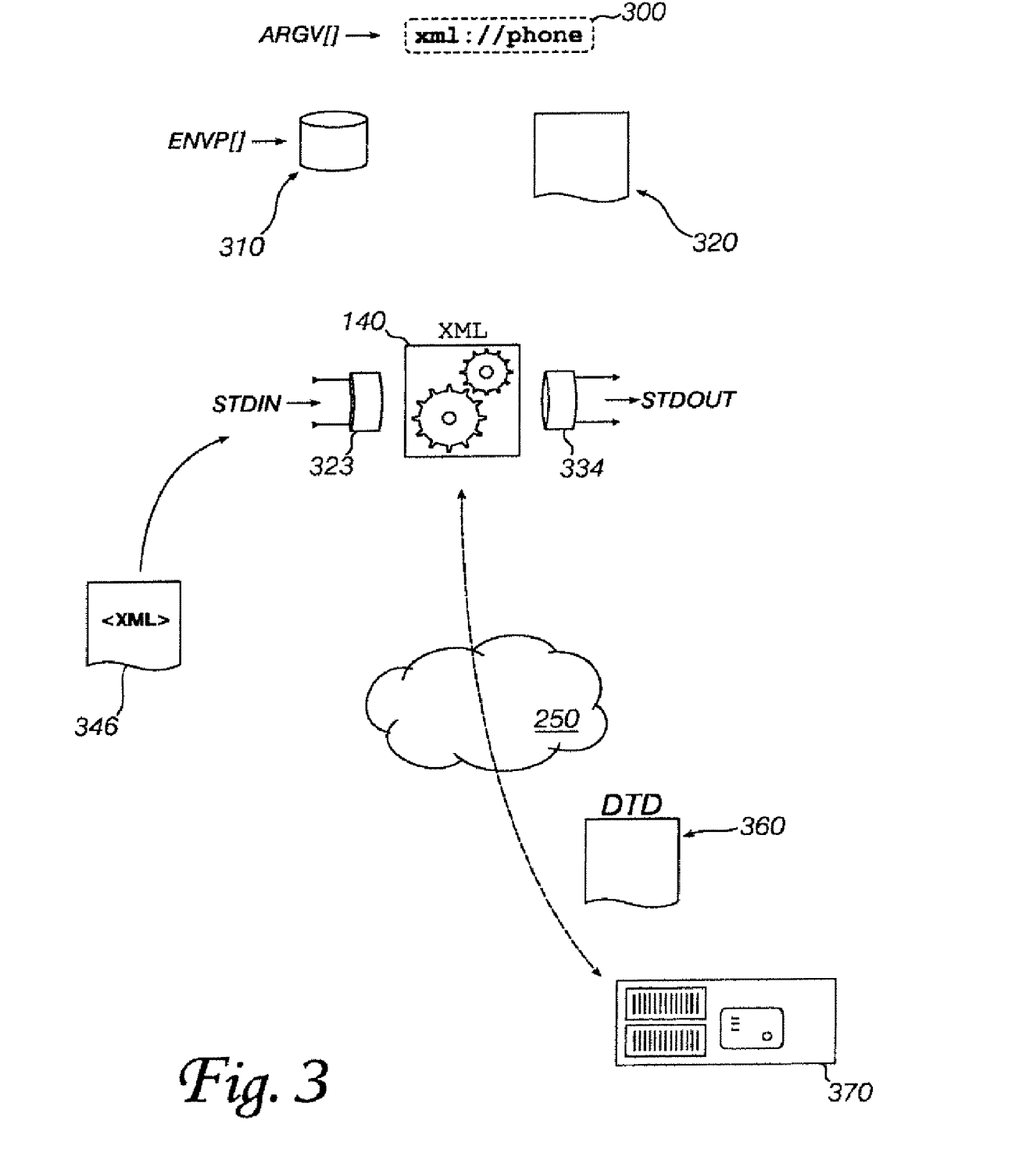
FIG. 3 is a detailed view of an embodiment that processes structured documents.

FIG. 3 shows details of a structured-document processing stage according to an embodiment of the invention. Like the remote service interaction process 130 described with reference to FIG. 2, process 140 can obtain information to govern its operations from a command line 300, an execution environment 310, and/or a configuration file 320. Process 140 also has a standard input 323 from which it receives data to be processed, and a standard output 334 to which processed results are written.

Process 140 receives structured data such as an Extensible Markup Language ("XML") document 346 on its standard input 323; locates specified portions of this structured data according to the information received via the command line 300, environment 310 or configuration file 320; and prints the specified portions on standard output 334. Some embodiments may recognize an identifier of a template document in the structured data input and retrieve this document from a system 370. For example, an XML-formatted structured document may reference a Document Type Definition ("DTD") document that describes a valid format for the XML data. Process 140 could request DTD 360 from system 370 (communications may occur over a distributed data network 250 such as the Internet).

Figure 4:
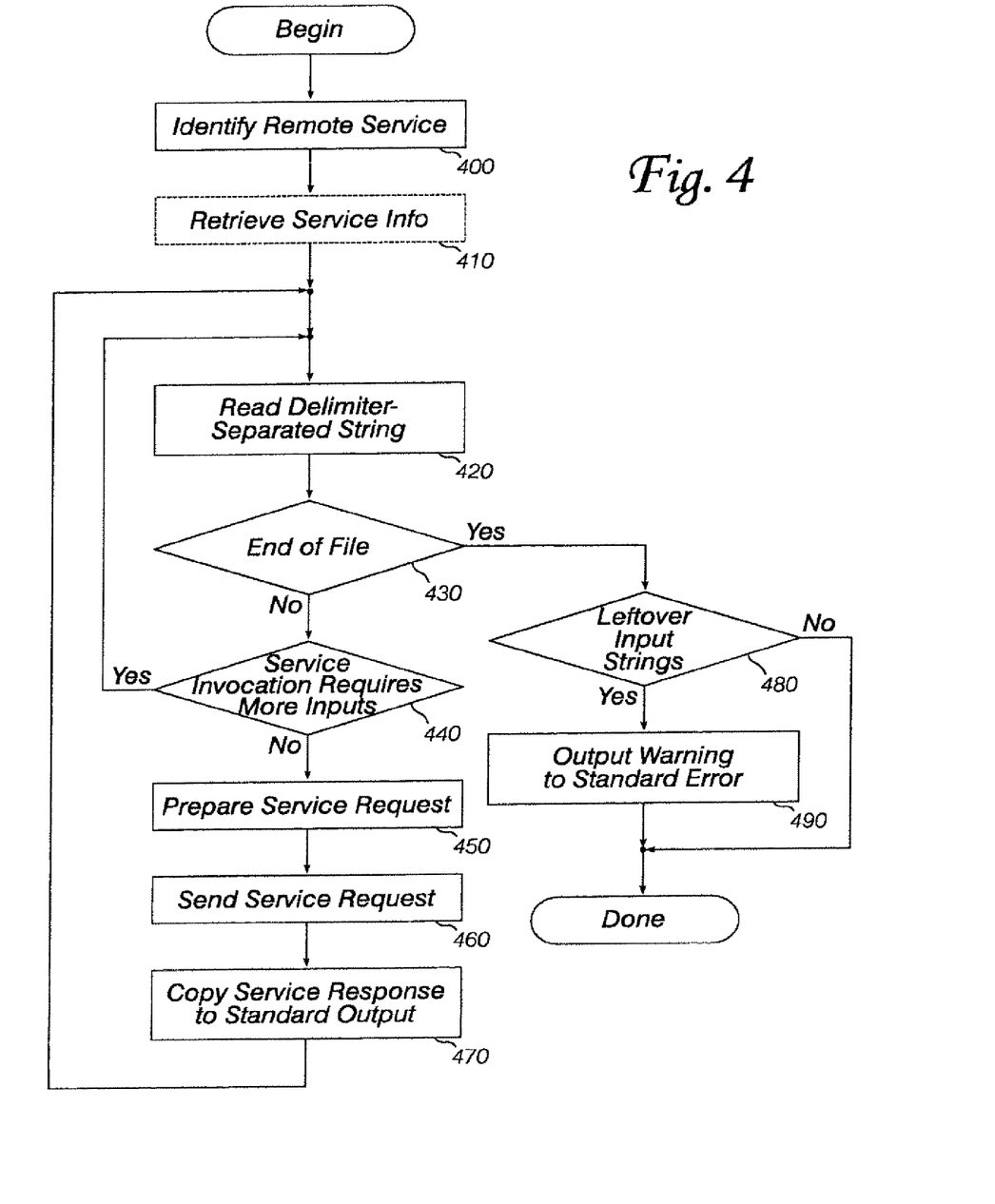
FIG. 4 is a flow chart of an embodiment of the invention.

FIG. 4 is a flow chart outlining operations of a process such as 130, described with reference to FIGS. 1 and 2. This process begins by identifying a remote service (400) with which it is to interact. The remote service may be specified as a Uniform Resource Locator ("URL") as discussed previously. The service could be provided by a different process executing on the same system, or by a process executing on a different system.

In some embodiments, information about the remote service may be retrieved (410) from an information broker such as a UDDI server. Other embodiments may have information about the proper format for requests to the remote service built in, or obtained in some other way.

Next, a delimiter-separated string is read from standard input (420). In Unix systems, the newline character is often used as a delimiter, but colons, spaces, slashes or other characters can also serve. If an end-of-file condition is not encountered during this read (430), then the number of delimiter-separated strings collected so far is compared to the number required for a service invocation. If more strings are required (440), the embodiment loops back to read another one. Otherwise, a service request is prepared (450) and sent to the remote server (460). Any data received in response to the request is written to standard output (470), and the process repeats.

If an end-of-file condition is encountered while reading a delimiter-separate string (430), then if a partial set of strings for a request is left over (480), a warning message may be written to the standard error (490) before the process terminates.

The process described with reference to FIG. 4 can be thought of as collecting one or more input strings (e.g., words or lines) from standard input, packaging them into a request for a remote service such as a web service, issuing the request, and printing any results to standard output. Additional strings obtained from standard input may be packaged into successive requests, and results corresponding to these successive requests are also printed to standard output. Printed results may be separated by a delimiter (e.g., a newline character) to facilitate subsequent processing by another utility in the data-processing pipeline.

Figure 5:
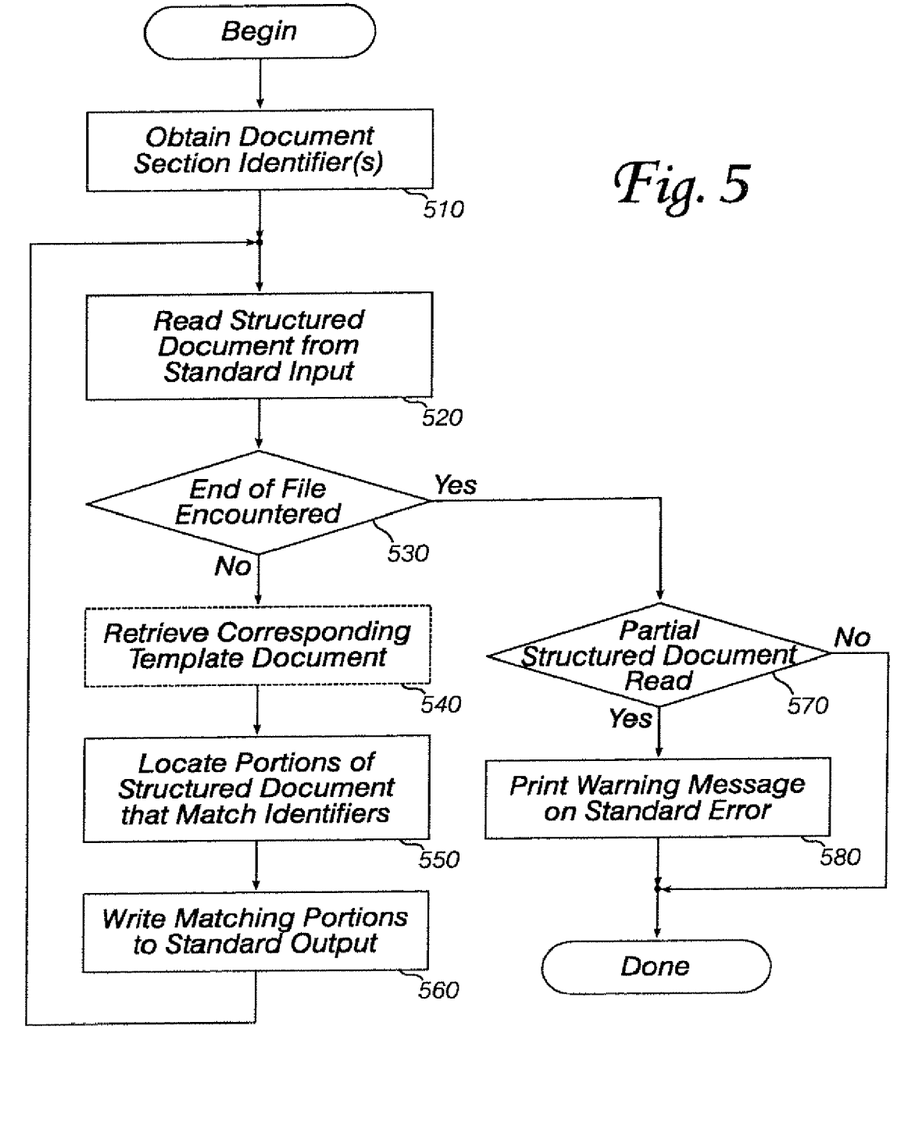
FIG. 5 is a flow chart of another embodiment of the invention.

FIG. 5 is a flow chart outlining the operations of another embodiment of the invention. This embodiment, roughly speaking, reads structured data such as an XML document from its standard input, locates certain specified portions of the data, and prints the located portions on its standard output. In detail, the embodiment obtains document section identifiers (510), which may be specified on a command line using a syntax such as an XML Path Language ("XPath") expression. Then, structured data is read from the standard input (520). If no end-of-file is encountered, a template document corresponding to the structured data may be retrieved (540), and portions of the structured data corresponding to the document section identifiers are located (550). Any matching portions are written to standard output (560) for further processing by other utilities in a data-processing pipeline. The matching portions may be written as one or more delimiter-separated text strings. For example, each matching portion may be written followed by a newline character. If an end-of-file is encountered while reading structured data from standard input (530), then if a partial structured document has been read (570), a warning message may be printed on standard error (580) before the process finishes.

Figure 6:
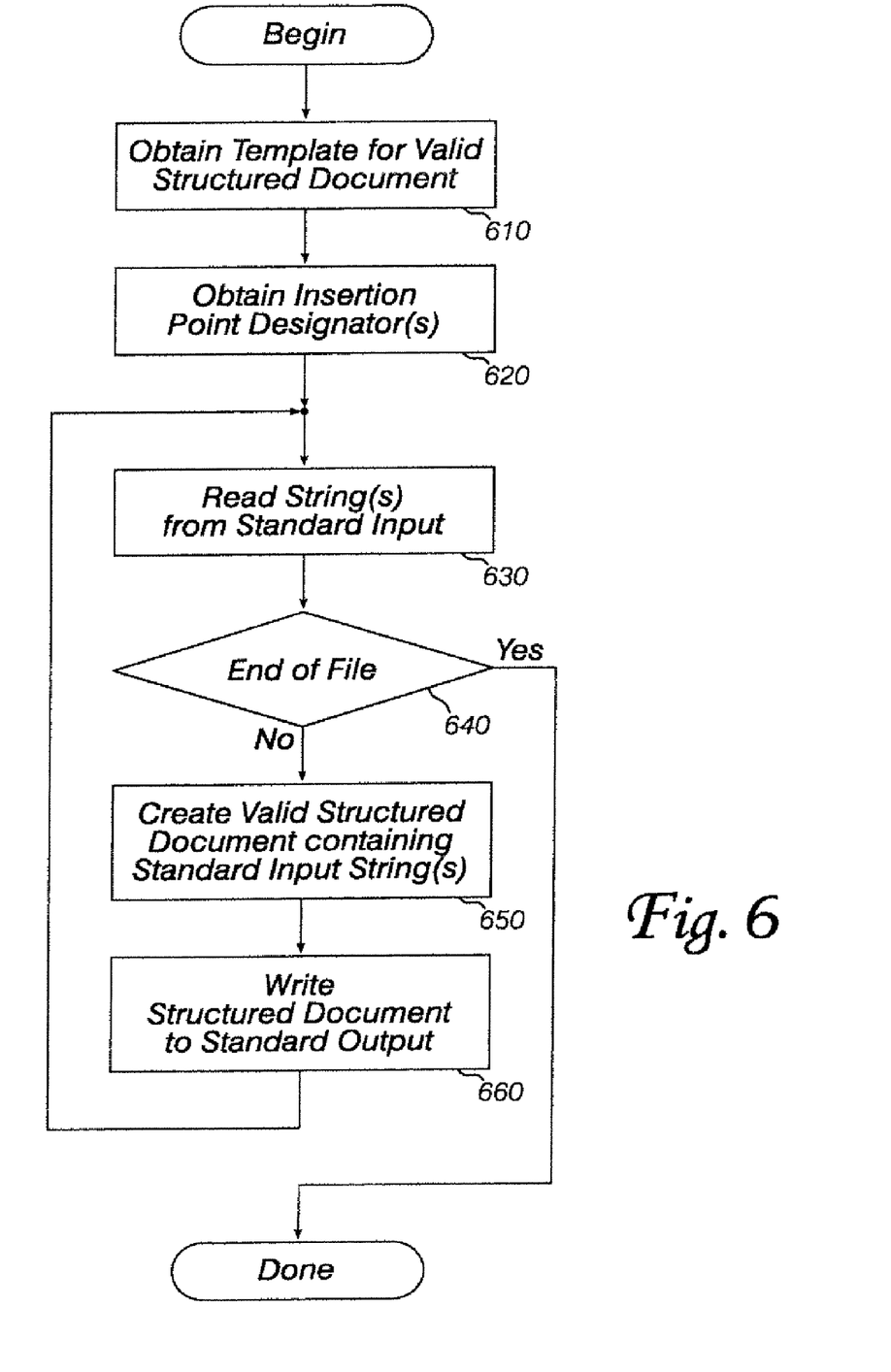
FIG. 6 is a flow chart of another embodiment of the invention.

FIG. 6 is a flow chart outlining operations of an embodiment that reverses the structured-data-to-selected-items processing described above. This embodiment receives unstructured data (e.g., delimiter-separated text strings) on its standard input, and produces a valid structured document on its standard output. The format or template used may be given by a command-line argument. This embodiment of the invention can be thought of as a translator or interpreter to place unstructured data (e.g., lines of text) into a structured format (e.g., an Extensible Markup Language ["XML"] document) for processing by a service or utility that expects such structured input. In some ways, it is like an embodiment that prepares SOAP requests from delimiter-separated strings on standard input: SOAP requests are also a form of structured document. However, instead of sending the structured document to a web service to request processing, this embodiment simply writes the structured document to its standard output.

To begin, this embodiment obtains a template for the desired structured document (610). Also, insertion point designators are obtained (620). The insertion points may be indicated by XPath expressions. Then, one or more delimiter-separated strings are read from standard input (630) (the number of strings is equal to the number of insertion points). If an end of file condition is encountered (640), processing is complete. Otherwise, a valid structured document is prepared (650) based on the template and the strings from standard input, inserted at points identified by (for example) XPath expressions. The structured document is written to standard output (660), and the process loops back to read more strings from standard input. Some embodiments may output a delimiter to mark the end of one structured document (and the beginning of the next); other embodiments may rely on the receiver of the structured data being able to identify the boundaries between structured documents itself.

Figure 7:
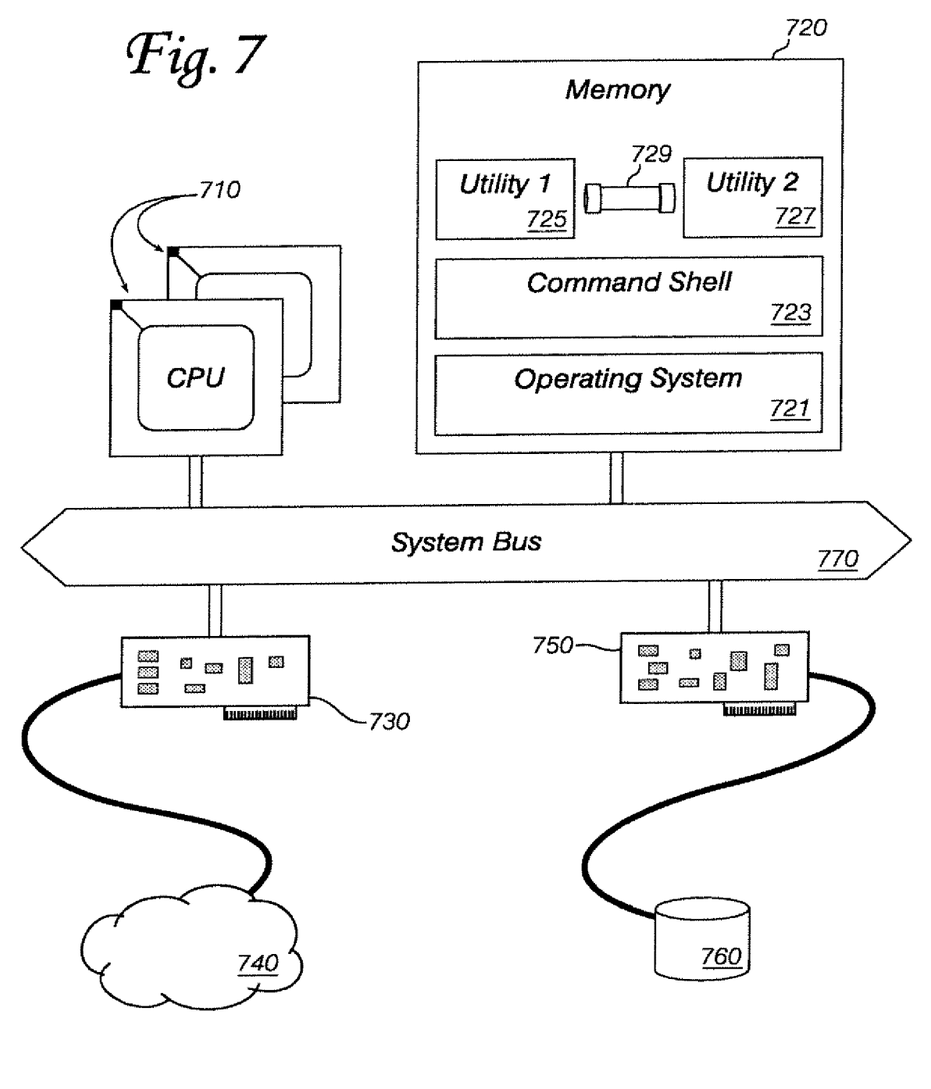
FIG. 7 is a block diagram of a system according to an embodiment of the invention.

FIG. 7 is a block diagram showing some components and subsystems of a computer system that contains an embodiment of the invention. Central processing units ("CPUs") 710 are programmable processors that execute instructions stored, for example, in memory 720 to perform operations as described above. Memory 720 may contain instructions and data to implement an operating system ("OS") 721, a command shell 723, and a plurality of data manipulation utilities 725, 727, which communicate via an interprocess communication facility 729 set up by command shell 723.

The system may include hardware 730 to interface with a data communication network 740 such as the Internet. Hardware 730 and software drivers (not shown) within operating system 721 cooperate to modulate a carrier signal with data to be sent to another system via network 740. Another hardware interface 750 may permit the system to store and retrieve data on a mass storage device such as a hard disk 760. These components are connected to, and exchange data and control signals via, system bus 770.

Figure 8:
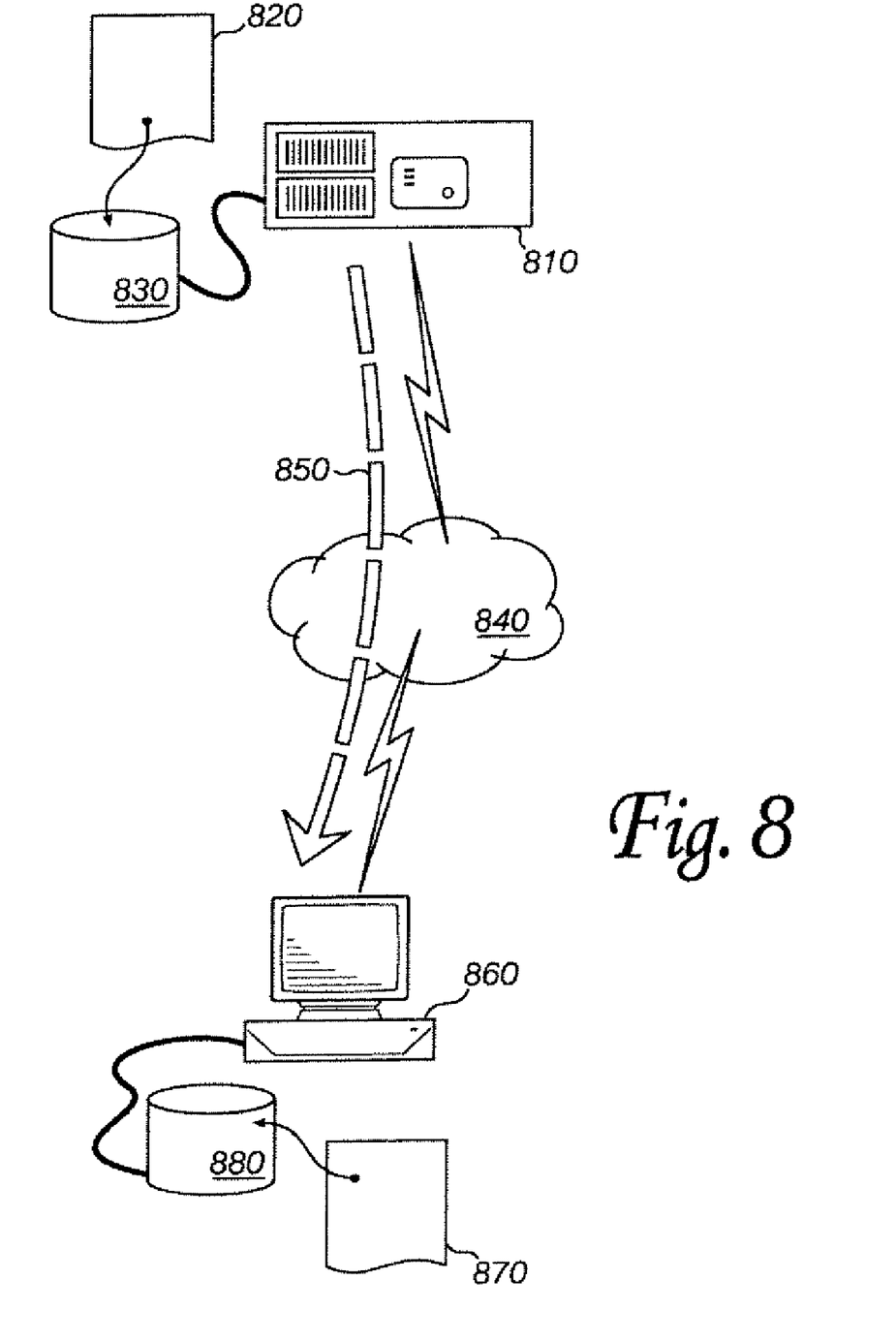
FIG. 8 shows system interactions according to an embodiment of the invention.

FIG. 8 shows another embodiment of the invention. A first computer system 810 has data and instructions (software) to implement an embodiment of the invention 820, stored on a computer-readable storage medium 830. Other instructions (not shown) executing within system 810 cause the system to modulate a carrier signal with the data and instructions 820 and transmit the modulated signal to a receiving system 860 (transmission shown as broken arrow 850). System 860 receives the modulated signal, extracts the data and instructions 870 from it, and stores them on another computer-readable storage medium 880. Data and instructions 820 may be in a number of different formats, discussed below.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a machine-readable medium storing data and instructions to perform some of the operations discussed above. Executing such an embodiment at the receiver may result in the receiver performing operations according to a third embodiment.

In the foregoing description, numerous details were set forth. It will be apparent, however, to one skilled in the art, that the present invention may be practiced without these specific details. In some instances, well-known structures and devices were shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "sending," "receiving," "attaching," "forwarding," "caching," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention was not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that structured document creation and processing can also be integrated into Unix-style data pipelines by software and hardware that distribute the functions of embodiments of this invention differently than herein described. Such variations and implementations are understood to be captured according to the following claims.

What is claimed is:

1. A method comprising:
reading, by a computer system, at least one delimiter-separated string on a standard input, the at least one delimiter-separated string pertaining to a web service specified by a command-line argument;
identifying a format associated with the web service;
preparing a request to the web service from the at least one delimiter-separated string using the identified format;
transmitting the request to the web service; and
providing, to a standard output, a response of the web service to the request.

2. The method of claim 1, wherein:
identifying the format associated with the web service comprises obtaining an input structure for the web service from a web service description database, and
preparing the request to the web service comprises encoding the at least one delimiter-separated string according to the input structure.

3. The method of claim 2 wherein the web service description database is a Universal Description, Discovery and Integration ("UDDI") service.

4. The method of claim 2 wherein the request is a first request, the method further comprising:
determining a number of input parameters of the input structure, wherein the at least one delimiter-separated string is a number of delimiter-separated strings equal to the number of input parameters;
the method further comprising preparing a second request to the web service using a second set of at least one delimiter-separated strings;
transmitting the second request to the web service; and
printing an output from the web service responsive to the second request to the standard output.

5. The method of claim 4, further comprising:
printing an output delimiter after printing the output from the web service responsive to the first request and before printing the output from the web service responsive to the second request.

6. The method of claim 1 wherein the request is a Simple Object Access Protocol ("SOAP") object.

7. The method of claim 1 wherein the output from the web service is an Extensible Markup Language ("XML") document.

8. The method of claim 1 wherein a delimiter of the at least one delimiter-separated string is a newline.

9. A system comprising:
a memory; and
a processor, coupled to the memory, to:
read at least one delimiter-separated string on a standard input, the at least one delimiter-separated string pertaining to a web service specified by a command-line argument;
identify a format associated with the web service;
prepare a request to the web service from the at least one delimiter-separated string using the identified format;
transmit the request to the web service; and
provide, to a standard output, a response of the web service to the request.

10. The system of claim 9, wherein the processor is to:
identify the format associated with the web service by obtaining an input structure for the web service from a web service description database, and
prepare the request to the web service by encoding the at least one delimiter-separated string according to the input structure.

11. The system of claim 10 wherein the web service description database is a Universal Description, Discovery and Integration ("UDDI") service.

12. The system of claim 9 wherein the request is a Simple Object Access Protocol ("SOAP") object.

13. The system of claim 9 wherein the output from the web service is an Extensible Markup Language ("XML") document.

14. The system of claim 9 wherein a delimiter of the at least one delimiter-separated string is a newline.

15. A non-transitory computer-readable storage medium having executable instructions to cause a computer to perform a method comprising:
- reading, by a computer system, at least one delimiter-separated string on a standard input, the at least one delimiter-separated string pertaining to a web service specified by a command-line argument;
- identifying a format associated with the web service;
- preparing a request to the web service from the at least one delimiter-separated string using the identified format;
- transmitting the request to the web service; and
- providing, to a standard output, a response of the web service to the request.

16. The computer-readable storage medium of claim 15, wherein:
- identifying the format associated with the web service comprises obtaining an input structure for the web service from a web service description database, and
- preparing the request to the web service comprises encoding the at least one delimiter-separated string according to the input structure.

17. The computer-readable storage medium of claim 16 wherein the web service description database is a Universal Description, Discovery and Integration ("UDDI") service.

18. The computer-readable storage medium of claim 16 wherein the request is a first request, the method further comprising:
- determining a number of input parameters of the input structure, wherein the at least one delimiter-separated string is a number of delimiter-separated strings equal to the number of input parameters;
- the method further comprising preparing a second request to the web service using a second set of at least one delimiter-separated strings; transmitting the second request to the web service; and
- printing an output from the web service responsive to the second request to the standard output.

19. The computer-readable storage medium of claim 18, further comprising:
- printing an output delimiter after printing the output from the web service responsive to the first request and before printing the output from the web service responsive to the second request.

* * * * *